March 31, 1925. 1,531,470
J. G. WILSON
ROTARY ENGINE
Filed April 5, 1924
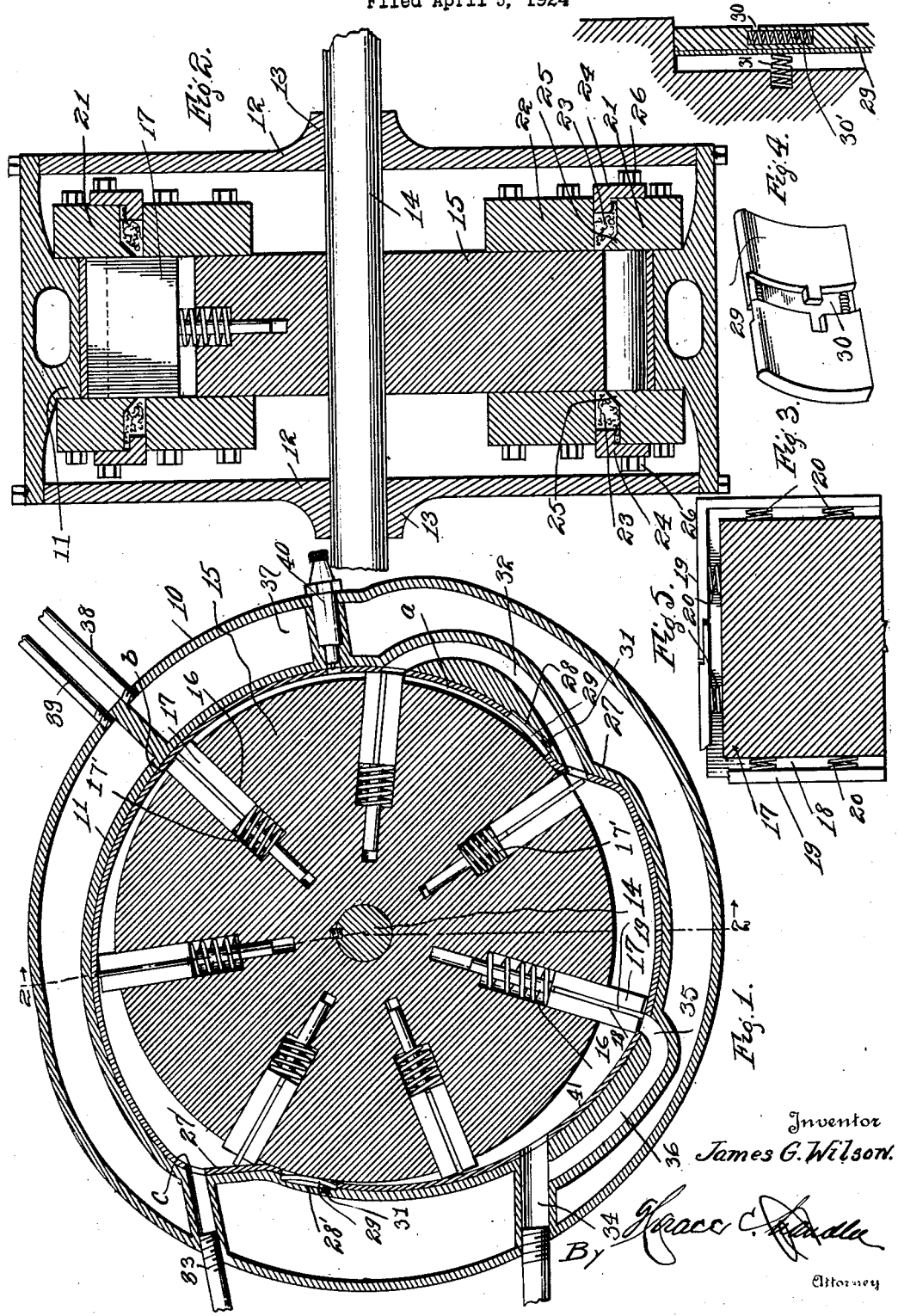
Inventor
James G. Wilson.

Patented Mar. 31, 1925.

1,531,470

UNITED STATES PATENT OFFICE.

JAMES G. WILSON, OF IAEGER, WEST VIRGINIA.

ROTARY ENGINE.

Application filed April 5, 1924. Serial No. 704,470.

*To all whom it may concern:*

Be it known that I, JAMES G. WILSON, a citizen of The United States, residing at Iaeger, in the county of McDowell, State of West Virginia, have invented certain new and useful Improvements in Rotary Engines; and I do hereby declare the following to be a full, clear, and exact description of the invention, such as will enable others skilled in the art to which it appertains to make and use the same.

This invention relates to new and useful improvements in engines, and particularly to rotary gas engines.

One object of the invention is to provide an engine of this character wherein a charge of gas is compressed and exploded at one point in the rotation of the rotor, and delivered immediately to another point in advance thereof.

Another object is to provide a rotary engine of this character wherein the gases are compressed and exploded in advance of one piston, and permitted to pass into impact with another piston in advance of the compressing piston, at the instant of the explosion of the gases.

Another object is to provide an engine of this character wherein the explosion chamber is of uniform width and depth, whereby to prevent any tendency of the explosion to act in a retrograde direction.

Other objects and advantages will be apparent from the following description when taken in connection with the accompanying drawing.

In the drawing:

Figure 1 is a vertical sectional view of a gas engine made in accordance with the present invention.

Figure 2 is a vertical transverse sectional view on the line 2—2 of Figure 1.

Figure 3 is an enlarged perspective view of one of the abutments.

Figure 4 is a section through the abutment.

Figure 5 is an enlarged section of a piston.

Referring particularly to the accompanying drawing, 10 represents a ring which has the central circumferentially extending, and interiorly arranged rib 11. Disposed within the ring 10, and secured thereto adjacent the opposite marginal edges, are the disks 12, each having a central apertured boss 13 for rotatably receiving an end portion of the shaft 14. Keyed on the shaft 14, for rotation inwardly of the rib 11, is the rotor 15, said rotor having a series of radially extending pockets 16, extending through its peripheral face, and disposed in each of these pockets is a piston 17, having communicating grooves 18 in their end and narrower side faces, within which are disposed the packing rings 19. Between these rings 19 and the bottom walls of the grooves 18 are the springs 20 which urge the packing rings outwardly against the inner face of the rib 11, and against the inner faces of the larger rings 21, which are secured to the opposite side faces of said rib. Secured to the opposite side faces of the rotor 15, with their outer peripheral faces lying in the same plane as that of the periphery of the rotor, are the rings 22. Disposed between the inner peripheral faces of the rings 21, and the outer faces of the rings 22, are the packing strips 23, and secured to the rings 21 are the rings 24, which are angle bars, as seen in Figure 2, with their horizonal wings engaged between the rings 21 and 22, to force the packing strips into compressed condition, to prevent leakage of gases. The inner faces of the rings 21, adjacent the periphery of the rotor 15, are formed with the circumferential ribs 25, which serve to prevent the packing strips 23 being forced inwardly beyond the inner faces of the said rings. By turning up on the attaching bolts 26, the strips 23 may be compressed to the degree desired to provide the proper and effective prevention against leakage. Disposed in the sockets 16, for yieldably holding the piston 17 outward against the rib 11, are the coil springs 17'.

The inner face of the rib 11 is concentric with the periphery of the rotor 15 between the points $a$ and $b$, and from the point $b$ the said face gradually recedes to the point $c$, terminating at the outer end of the shoulder 27'. From the point $a$ the inner face of the rib gradually approaches the periphery of the rotor in the direction of the shoulder 27. In the said face of the rib 11, slightly beyond the shoulder 27', and between the point $a$ and the shoulder 27, respectively, there are formed the recesses 28' and 28, and disposed in each recess is an abutment plate 29 formed in two sections having a splice joint 30, and the coil springs 30' therebetween, for urging the sections outwardly against the rings 21. Within each recess is disposed a spring 31 which urges the plate 29 into contact with the peripheral face of the rotor 15, whereby to form a gas-tight joint therebetween. Formed in the rib 11, and extending outwardly around the recess 28, is a passage 32, one end of said passage opening through the adjacent shoulder 27. Leading through the ring 10, and opening into the space between the rings 21, through the other shoulder 27', is a gas inlet 33, by means of which live gas is delivered to the engine. Formed in the ring 10, at a point midway of the shoulders 27 and 27', is the exhaust 34, and at a suitable distance therefrom, in the direction of the recess 28, is a second port 35, opening into the casing, and being connected with the exhaust 34 by the passage 36.

The ring 10 is formed with a water space 37, which extends entirely therearound, the pipes 38 and 39 being provided for delivering water into such space and delivering same out of said space, respectively.

Extending inwardly through the ring 10, at a point beyond the end of the passage 32 which is remote from the shoulder 27, is a spark plug 40, said plug being arranged to ignite the gas within the space between the points $a$ and $b$, and by reason of the uniform depth of said space, there will be no tendency of the exploding gases to cause a retrograde movement of the rotor.

The gas is admitted through the port 33, and impinges against the nearest piston 17, beyond the shoulder 27'. As the rotor turns and the piston approaches the point $b$ the gas which is confined between said pistons and the piston immediately therebehind is compressed to the desired degree, and when it has passed into the space between the points $a$ and $b$, it is exploded by means of a spark from the spark plug 40. It will be noted that the gas, when exploded, is confined between two adjacent pistons 17, one of which is adjacent the passage 32, but at the instant that the gas is exploded, this advanced piston passes or uncovers the adjacent end of the passage, permitting the gas to pass through the passage, while it is burning. The burning gas escapes from the other end of the passage 32, and impacts against the piston 17 which has just passed or uncovered the other end of the passage 32, driving the rotor until the piston, against which the gas had exploded, has uncovered the adjacent opening or port 35, permitting the burnt gases to exhaust through the passage 36 to the exhaust 34. As this piston passes or uncovers the exhaust 34, the remaining portions of the burnt gases will escape, by means of the pipe 34'.

It will be noted that the inlet and outlet pipes for the water jacket are located diametrically opposite to the exhaust pipe 34, the inlet pipe 38 being arranged adjacent the passage 32, so that the coolest water will flow directly toward and around said passage, with the result that this portion of the engine, where the explosions take place, and which is hottest, is effectively cooled. The water, as it reaches its highest temperature, passes around to outlet pipe 39, thus heating the portion of the engine surrounding the inlet for the gas, with the result that the gas, as it enters the cylinder, is raised in temperature.

The inner face of the rib 11, against which the pistons 17 engage, is provided with a hard metal lining 41.

Particular attention is called to the fact that the firing chamber, that is the space between $a$ and $b$, permits explosions to properly take place without causing retrograde action against the rotor. It will also be noted that the gases pass through an unobstructed passage at the instant that they are exploded, with the result that the full force of the explosion is thrown against the piston which has just passed the end of the passage which leads through the shoulder 27.

What is claimed is:

1. A rotary engine including a casing, a rotor within the casing, pistons in the rotor, an adjacent pair of which form a compression and explosion chamber therebetween means for exploding a charge of gas between a pair of pistons, and means for delivering the exploding charge of gas out of the said chamber and against a piston in advance of said chamber.

2. A rotary engine including a casing, a rotor within the casing, radial pistons in the rotor, an abutment in the casing engaged by the pistons, adjacent pistons being arranged to form an explosion chamber, in conjunction with the casing and rotor, the casing having a bypass for conducting exploding gases around said abutment and into impact with an advanced piston.

3. A rotary engine including a casing having an internal circumferential rib, a rotary element movable within the casing and in the plane of the rib, radial pistons carried by the rotary element engaging with the face of the rib, a portion of the rib being concentric with the periphery of the rotary element and being of a length approximately equal to the distance between two adjacent pistons, means for exploding gases within said concentric space, and means for conducting the exploding gases against the piston in advance of said two adjacent pistons.

4. A rotary engine comprising a casing including an internally ribbed ring and enclosing side walls, a rotor within the casing, radial pistons in the rotor engaging with the inner face of the rib of the casing, rings on the sides of the rib and engaging the sides of the pistons, a portion of the inner face of the rib being concentric with the periphery of the rotor and receding from said periphery from its opposite ends in opposite directions, packing on the rings engaging with the rotor, means for exploding gases between adjacent pistons when said pistons are at the ends of said concentric portion of the rib, and a passage for conducting the exploding gases to another piston in advance of said adjacent pistons.

JAMES G. WILSON.